Patented June 10, 1952

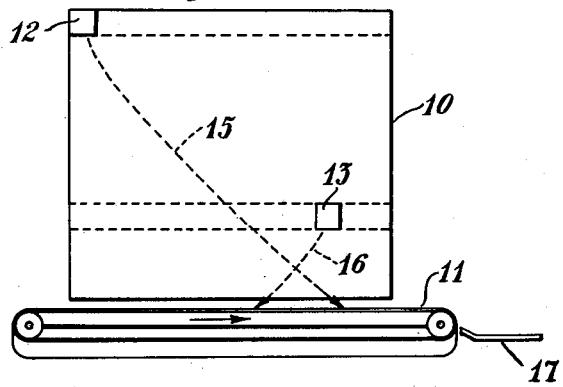
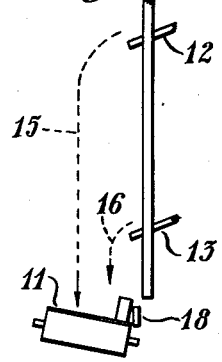
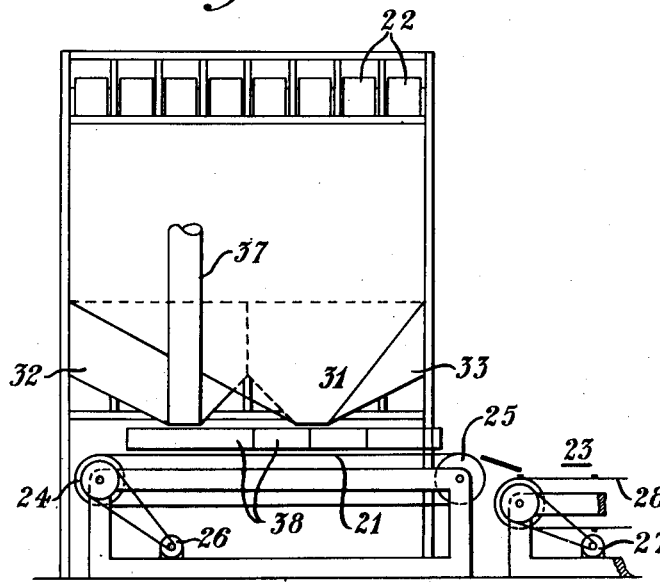
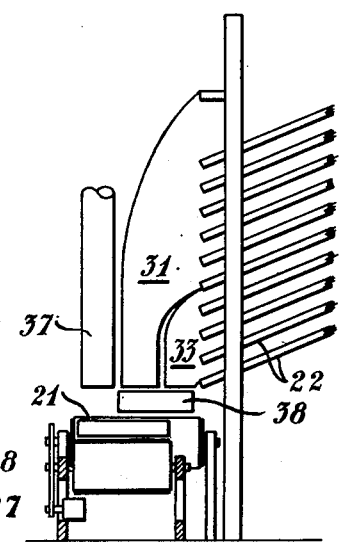

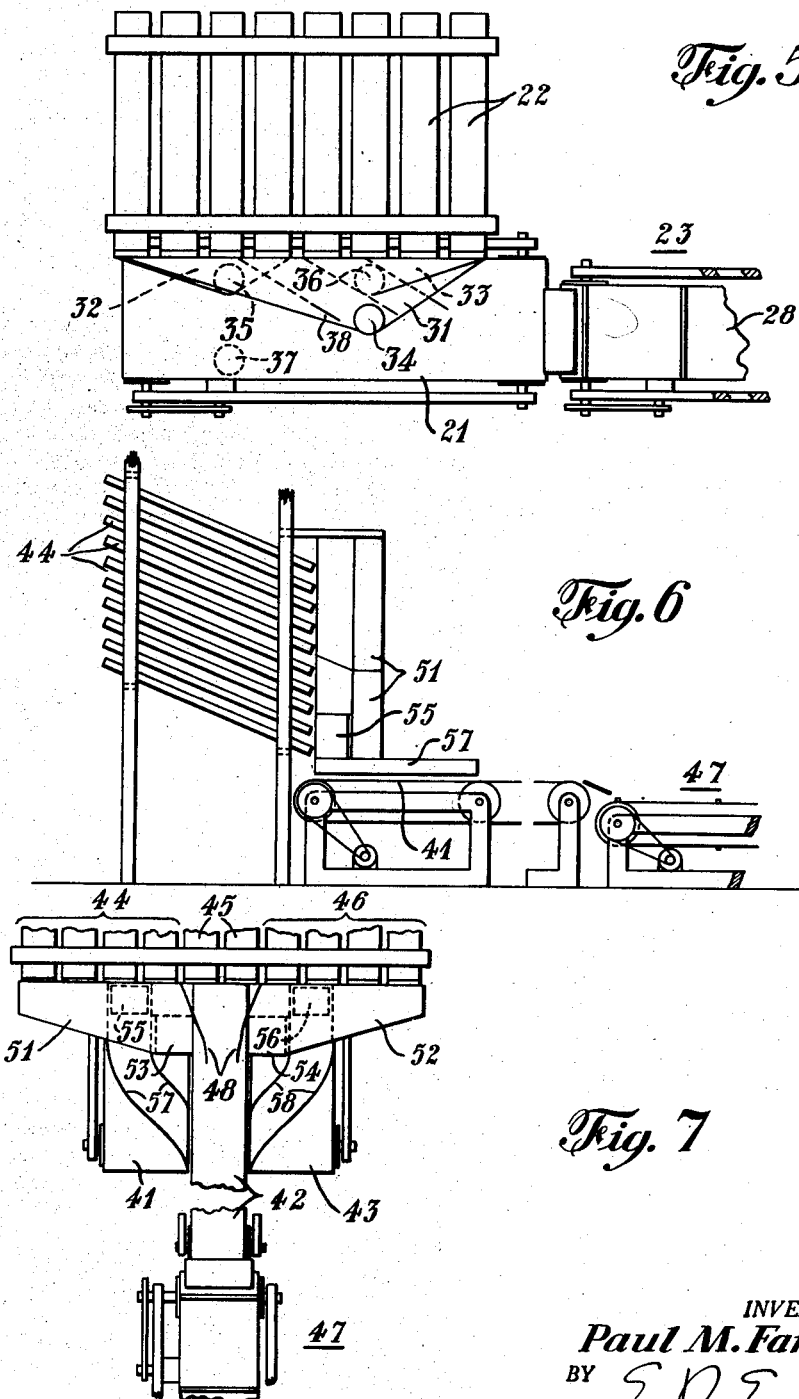

2,599,907

UNITED STATES PATENT OFFICE 2,599,907

ARTICLE DISPENSING AND CONVEYING SYSTEM

Paul M. Farmer, West Orange, N. J.

Application March 13, 1946, Serial No. 654,090

5 Claims. (Cl. 198—42)

This invention relates to systems and apparatus for the mechanical handling of merchandise articles, and their collection and segregation into separate orders or lots. Systems of this character are particularly adapted for use in retail stores, mail order establishments and the like where a multiplicity of different items are stored in considerable volume and it is necessary to select and deliver groups of desired items to a wrapping or assembly station as rapidly as possible.

An efficient article-storage and dispensing system to which the present invention is applicable may comprise one or more arrays of dispensing elements, each adapted to store a supply of a single item, with an electrically operated selector for releasing desired items from the respective dispensing elements and a conveyor for transferring the selected items to the point of assembly, as described in detail in my prior patents, Nos. 2,276,293 or 2,446,643. At the point of assembly, the items of separate orders or groups may be automatically segregated in accordance with the principles disclosed in my prior patent, No. 2,276,294, although in some installations this feature is not required. The disclosures of these prior patents are hereby incorporated in the present disclosure.

It will be understood that other similar or equivalent structures may be employed in connection with the present invention, since no attempt has been made to describe all of the modified forms of selecting, dispensing and conveying apparatus that can be employed in the mechanical large-scale dispensing of merchandise. This apparatus has been developed to the point where very rapid selection and dispensing from a large assortment of articles is an accomplished fact but the importance of other factors must not be overlooked. The problems of conveying the selected articles from storage, and segregating and handling the respective orders safely, speedily and accurately have to be especially considered.

In accordance with one feature of the present invention, improved means such as hoppers are provided to direct the articles released from groups of dispensing elements upon the conveyor belt or other transfer mechanism for the purpose of reducing the time interval which must be allowed between separate groups of items, comprising separate orders, to prevent mixing items of an order with the preceding or succeeding order. Accordingly it is one object of the invention to increase the efficiency of the system and thereby enhance the capacity of the system with respect to the number of orders that can be handled in a given period of time.

Another object of the invention is to obviate the possibility of injuring or damaging the merchandise by dropping an article from a dispensing element upon another article resting upon the conveyor belt or causing articles to clash injuriously.

A still further object of the invention is to provide improved means for positioning or redistributing articles on the conveyor during or prior to their transfer from the storage area to the delivery point.

Other objects and advantages of the invention will appear from the following description of the preferred embodiments thereof shown on the accompanying drawings, wherein:

Figs. 1 and 2 are front and side elevations, partially diagrammatic, of an array of dispensing elements with its associated conveyor belt in accordance with the invention;

Fig. 3 is a front elevation of a unit showing a preferred arrangement of distributing chutes and other features of the invention;

Figs. 4 and 5 are side and top elevations, respectively, of the unit shown in Fig. 3; and Figs. 6 and 7 are side and top elevations, respectively, of a modification.

Referring to Figs. 1 and 2, which illustrate the principles of the invention, for purposes of explanation it is assumed that the mechanical dispensing system includes an array 10 of dispensing elements arranged in vertically alined rows and a conveyor belt 11 for transferring articles released from the dispensing elements to a remote wrapping or assembly station, represented by a table or counter 17. The figures are intended to illustrate diagrammatically the relationship between exemplary forms of dispensing array and conveyor, typical of the many constructions that may be employed. In a retail food store, a system according to the invention would be required to handle as many as two or three thousand varieties of merchandise, dispensing selected items at the rate of, say, 100 a minute. Therefore a practical system is designed to work on this basis, and also arranged to deliver all of the items on each order before starting to deliver the next order, with a minimum separation time between orders.

In Fig. 1, one dispensing element near the end of the array most remote from the delivery point 17 and in an upper row or tier is indicated at 12 and a second element near the least remote end in the lower half of the array is indicated at 13. These dispensing elements may be similar to that described in my prior Patent No. 2,353,394, or any other suitable type adapted to be remotely controlled from the selective control station, to release an item stored therein upon the moving conveyor belt 11. In order to accommodate a considerable number of varieties of items, the frontage of such an array of dispensers along conveyor belt 11 would be such that several seconds of time would be required for an article deposited on the conveyor belt at the most remote (from delivery point 17) end of the array to travel to the least remote end of the array. If dispensed items were therefore allowed to drop directly from the dispensers onto the conveyor belt, it would be necessary for an equivalent period of time to elapse between the time that the last item of an order were dispensed and the time that the first item of the next succeeding order were dispensed, to prevent items of one order becoming associated with the next succeeding order. This time, plus a slight additional time margin to insure clean-cut distinction between separate orders is designated as "separation time" between orders. It will thus be seen that any reduction which can be made in the "separation time" will directly increase the handling rate of such an order assembly system.

Under the present invention an article released from 12 would be channeled or directed, by means described later herein, along path 15 to a point on conveyor belt 11 near the least remote end of the array, whereas an article dispensed from 13, at a lower level, and nearer the least remote end, could be channeled to a point somewhat more remote from delivery point 17. It will be noted that if articles from any point in the array were channeled instantly to one given point on conveyor belt 11, that the "separation time" (except for the slight time margin mentioned) could be cut to zero. One reason for channeling those from an upper level to a different point on the conveyor belt from those dispensed from a lower level, is to compensate for the time required for articles to fall the greater distance from the upper level. In this manner by channeling articles from upper levels to points closer to the delivery point, positioning of articles on the conveyor belt becomes more uniform in spacing, the separation time between orders can be reduced to a very small amount and the handling rate of the system correspondingly increased. However in a system where the dispensing elements can drop merchandise items in rapid succession onto the conveyor belt or other transfer means, it is also necessary to prevent the possibility of one article falling upon or clashing with a previously released article resting on the belt or striking in mid-air against an article released at a different time from a different level.

In accordance with another feature of the invention, the channeling of articles to definite selected points on the conveyor belt 11 is designed to eliminate injurious clashing between different articles. Since it is usually convenient to arrange the dispensing elements in tiers exceeding eight or ten feet in height, the speed of selection leads to the difficulty that one article, released for example from dispensing element 13, may be dropped upon an article previously released from the element 12, with the possibility of damaging one or both items. In accordance with the present invention, chutes or guides are provided to direct the articles released from the dispensing elements to a position on the belt 11 which is clear or free of previously dispensed items within one-half second or other necessary time interval imposed by the rate of operation of the selector. As described above, the articles released from the dispensing element 12 and adjacent elements may be guided along the path 15 to fall on the belt at a different point from those released from element 13. The conveyor belt 11 may also be tilted transversely of its length, as shown, so that articles dropped thereon will slide to one edge against the longitudinal rail 18; or deflector plates may be provided adjacent the upper surface of the belt as shown in Figs. 3–5. In this manner, articles released from the dispensing elements in the array 10 are prevented from dropping upon or clashing with previously released articles resting upon the conveyor belt 11. In addition, the articles released from the more remote dispensing elements, instead of dropping vertically upon the conveyor belt, are deflected in the direction the belt travels, thus shortening the transfer time and permitting selections to be effected more rapidly.

The number and arrangement of the chutes depends upon the cycling rate of the selector and the dimensions, particularly the height, of the array of dispensing elements. It should be borne in mind that two dispensing elements, one directly above the other, may be actuated on successive selections. Since a falling object drops approximately four feet in one-half second, the articles from elements in the same vertical row reach the conveyor almost the same instant if the first one selected is more than four or five feet above the second (on the assumption of a selection rate of approximately one per half-second). Accordingly the groups of dispensing elements are preferably sectionalized in upper and lower parts and separate chutes provided for each part. It will be further understood that the dispensing element array 10 may and ordinarily would be combined with other arrays, arranged opposite or serially along the conveyor.

The construction shown in Figs. 3, 4 and 5 represents a preferred embodiment of the principles set forth above. By way of example, a travelling conveyor belt 21 is shown as disposed in front of and beneath an array of dispensing elements 22, each comprising an inclined channel or shelf forming a storage space for articles as described in my Patent No. 2,353,394 above referred to. Articles released from the dispensing elements 22 in response to the operation of the selector, as explained in my prior patents, drop on the conveyor belt 21 for transfer to the assembly or wrapping station 23. The detailed construction of the dispensing elements is not shown in order to simplify the drawings. The station 23 is illustrated as including order-segregating equipment of the type described in Patent No. 2,276,294 but, as stated above, such equipment would not necessarily be employed in carrying out the invention.

As shown, the conveyor belt 21 is supported by pulleys 24 and 25, and is driven by a motor 26. Other forms of conveyors, such as an inclined chute, could be used. A motor 27 is shown for driving the segregating belt 28. The specific forms of these elements of the system form no part of the invention except as they are used therewith, as will be explained.

In accordance with the invention, guiding means in the form of hoppers 31, 32 and 33 having outlets or openings 34, 35 and 36, respectively, at the bottom thereof are provided for directing articles released from the storage area to predetermined points on the conveyor belt 21. The chutes or hoppers are preferably but not necessarily constructed of canvas or similar strong, pliant material. An additional chute or chutes 37 may be provided in connection with other dispensing elements (not shown) such for example as an array which may be mounted on the opposite side of the belt 21 from that shown. The openings 34, 35 and 36 are spaced apart, as shown in Fig. 5, so that articles released into one chute are so directed onto the conveyor belt 21 that they cannot drop on one released into another hopper. Furthermore the height of the tier of dispensing elements served by each hopper is so restricted that an article released therein will drop on the belt and be moved aside by the movement of the belt before another article released on the subsequent selection into the same hopper can reach the surface of the belt. In the construction shown, two hoppers 32 and 33 are provided for the bottom half of the dispensing array because the elevation of the lower tiers above the belt 21 is such that the slope of the bottom portion of a single broad hopper would not be great enough to chute the articles properly. The openings 35 and 36 of the hoppers 32 and 33 are in line along the conveyor belt but deflectors or baffles 38 arranged above and cross-wise of the belt redistribute the articles to a position on the front section of the belt (as viewed in Fig. 5) where they are not carried beneath the openings in other chutes; or the belt may be tilted as shown in Fig. 2.

It should also be noted, as explained above in connection with Figs. 1 and 2, that the chutes are arranged to deliver articles released from the dispensing elements most remote from the wrapping station 23 to advanced positions on the conveyor belt, thus reducing the time of transfer to the wrapping station or assembly point. The construction shown can be modified in various ways in accordance with the underlying principles set forth, as by varying the relationship between the dispensing array and the conveyor means.

Figs. 6 and 7 illustrate a modification in which a plurality of transverse conveyor belts 41, 42 and 43 are disposed beneath the front of the dispensing element array consisting of tiers of dispensing elements 44, 45 and 46 arranged side-by-side. The central belt 42 is alined with the elements 45 and is extended to the delivery or segregating station 47. Where the distance to delivery point is not great, a single wide belt may prove preferable. No chute or hopper is shown in connection with dispensing elements 45 but baffles 48 may be provided to deflect articles away from the edges of the belt. The articles released from the dispensing elements 45 are of such character as to withstand any accidental contact or clashing with each other. Hoppers 51 and 52, of canvas or other suitable material, direct articles from the upper sections of elements 44 and 46, respectively, through the openings 53 and 54 onto the belts 41 and 43. Similarly hoppers 55 and 56 direct the fall of articles from the lower sections of elements 44 and 46 upon points on the belts 41 and 43 laterally spaced from each other and from the openings 53 and 54. Curved baffles or deflectors 57 and 58 are arranged, as shown, to channel the articles on the short belts 41 and 43 onto the belt 42 for transfer to the assembly point. Thus in accordance with the principles set forth above, articles released on successive selections are prevented from dropping on or clashing with each other and in such a manner as to minimize the separation time between successive orders. As explained above, the invention is especially applicable to an article dispensing and conveying system in which articles stored in tiers or arrays of dispensing units are released at intervals greater than a predetermined time interval, for example one-half second, upon a conveyor belt or belts for transfer to an assembly or wrapping station.

It will be apparent that the invention by coordinating the timing of the release of articles with the location from which they are released ("altitude" and "longitude") and the position on the belt to which they are channeled, provides a simple and effective means of obviating damage to articles handled in a high-speed conveyor system of this kind, and increases the speed of order assembly. Various modifications of the system may be made without departing from the scope of the invention.

I claim:

1. In an article-handling system, in combination, an array of dispensing elements, each adapted to store a supply of an article, a tilted conveyor belt in front of said array and means to deliver articles thereto from said dispensing elements at a point above the lower edge of the belt to minimize the possibility of dropping one article upon another resting on the belt.

2. In an article-handling system, in combination, storage means for a multiplicity of articles, said storage means having a compact substantially in-line array of delivery openings through which the respective articles are released after selection, a conveyor belt for transferring released articles to a separate location and a plurality of guides having top openings each disposed beneath a group of said delivery openings to receive articles dropping by gravity from said storage means, said guides further having bottom openings above spaced points on said conveyor belt, the bottom opening of a guide handling articles from more remote delivery openings being ahead of a bottom opening handling articles from delivery openings nearer said separate location.

3. In an article-handling system, in combination, storage means for a multiplicity of articles, said storage means having a compact vertical array of delivery openings through which the respective articles are released after selection, conveyor means beneath said delivery openings for transferring released articles to a separate collection point and a plurality of guides to receive articles dropping by gravity from said storage means and direct them to said conveyor means, one of said guides having a top opening opposite an upper group of said delivery openings and a bottom opening above an advanced point on the conveyor means, another of said guides having a top opening opposite a lower group of said delivery openings and a bottom opening above a point on the conveyor means behind said first-mentioned bottom opening to equalize transfer time.

4. In an article-handling system, in combination, tiers of storage elements for a multiplicity of articles, said storage elements having a compact array of delivery openings through which selected articles are released, said delivery openings constituting groups arranged one above another, each of said groups being limited in vertical span to the distance which a released article falls in the minimum interval between successive release operations, separate guides each having a top opening to receive articles falling by gravity from a separate group of said delivery openings, a conveyor beneath said guides to transfer articles to a separate collection point and means including said guides for distributing released articles on said conveyor to minimize the possibilities of clashing between a falling article and another article previously released into any of said guides and resting on the belt.

5. In an article-handling system of the character described, in combination, tiers of storage elements for a multiplicity of articles, said storage elements having a compact array of delivery openings through which selected articles are released, said delivery openings constituting groups arranged one above another, each of said groups being limited in vertical span to the distance which a released article falls in the minimum interval between successive release operations, a conveyor beneath said delivery openings to transfer released articles to a separate collection point, means for causing transverse movement of articles resting on said conveyor in transit to said point and a guide extending between the bottom of each group of delivery openings and said conveyor, said guides having outlets above said conveyor.

PAUL M. FARMER.

REFERENCES CITED

The following references are of record in the file of this patent:

UNITED STATES PATENTS

| Number | Name | Date |
|---|---|---|
| 326,153 | Richards | Sept. 15, 1885 |
| 699,690 | Leetham | May 13, 1902 |
| 749,459 | Stevens | Jan. 12, 1904 |
| 1,093,815 | Whittier | Apr. 21, 1914 |
| 1,109,284 | Friel | Sept. 1, 1914 |
| 1,332,356 | Olson | Mar. 2, 1920 |
| 1,358,913 | Young | Nov. 16, 1920 |
| 1,646,714 | Taylor | Oct. 25, 1927 |
| 2,355,708 | Delucchi | Aug. 15, 1944 |

FOREIGN PATENTS

| Number | Country | Date |
|---|---|---|
| 563,609 | Germany | Nov. 7, 1932 |